(12) United States Patent
McLaughlin et al.

(10) Patent No.: US 8,484,545 B2
(45) Date of Patent: Jul. 9, 2013

(54) SECURE COMMUNICATION USING ERROR CORRECTION CODES

(75) Inventors: Steven William McLaughlin, Decatur, GA (US); Demijan Klinc, Atlanta, GA (US); Byung-Jae Kwak, Daejeon (KR); Dong Seung Kwon, Daejeon (KR)

(73) Assignees: Georgia Tech Research Corporation, Atlanta, GA (US); Electronic and Telecommunications Research Institute, Daejon (KR)

( * ) Notice: Subject to any disclaimer, the term of this patent is extended or adjusted under 35 U.S.C. 154(b) by 449 days.

(21) Appl. No.: 12/765,966

(22) Filed: Apr. 23, 2010

(65) Prior Publication Data

US 2010/0275093 A1 Oct. 28, 2010

Related U.S. Application Data

(60) Provisional application No. 61/171,937, filed on Apr. 23, 2009.

(51) Int. Cl.
*H03M 13/03* (2006.01)

(52) U.S. Cl.
USPC ........................................................ 714/790

(58) Field of Classification Search
USPC ........................................................ 714/790
See application file for complete search history.

(56) References Cited

U.S. PATENT DOCUMENTS

| | | | | |
|---|---|---|---|---|
| 7,269,138 B2* | 9/2007 | Huang et al. | ................... | 370/231 |
| 7,657,824 B2* | 2/2010 | Ha et al. | ........................ | 714/790 |
| 7,743,312 B2* | 6/2010 | Choi et al. | ..................... | 714/790 |
| 7,904,792 B2* | 3/2011 | Kim et al. | ...................... | 714/774 |
| 8,078,934 B2* | 12/2011 | Febvre et al. | .................. | 714/755 |
| 8,132,072 B2* | 3/2012 | El-Khamy et al. | ............. | 714/755 |
| 2006/0206781 A1* | 9/2006 | Choi et al. | ..................... | 714/758 |
| 2007/0226583 A1* | 9/2007 | Kim et al. | ...................... | 714/758 |
| 2012/0166917 A1* | 6/2012 | El-Khamy et al. | ............. | 714/790 |

OTHER PUBLICATIONS

Jeongseok, Ha, Jaehong Kim, and McLaughlin, Steven W.,: "Rate-Compatible Puncturing of Low-DensityParity-Check Codes" IEEE Transactions on Information Theory, vol. 50, No. 11, Nov. 2004, XP002590771 (retrieved on Jul. 6, 2010).

Choi, Sunghoon, Noh, Kwangseok, Shiny, Jeong Hwan and Heo, Jun: "Rate-Compatible Punctured LDPC Codes based on Recovery Tree" International Symposium on Information Theory and its Applications, ISITA2008 Dec. 2008, XP002590772 Retrieved from the internet: URL:http://ieeexplore.ieee.org/stamp/stamp.jsp?arnumber=04895650&tag=1 (retrieved on Jul. 7, 2010).

(Continued)

*Primary Examiner* — Amine Riad
(74) *Attorney, Agent, or Firm* — Thomas|Horstemeyer, LLP

(57) ABSTRACT

Systems and methods for selecting a puncturing pattern for a low density parity check (LDPC) code are disclosed. One such method comprises: selecting a puncture pattern distribution for the LDPC code; calculating a security threshold and a reliability threshold for the LDPC, the LDPC having the selected puncture pattern distribution and also described by a degree distribution; storing the selected puncture pattern distribution responsive to a security gap for the LDPC being a lowest value encountered in any prior iterations; selecting another puncture pattern distribution for the LDPC code; and repeating the calculating, the storing, and the selecting another puncture pattern distribution steps.

20 Claims, 7 Drawing Sheets

OTHER PUBLICATIONS

Jeongseok, Ha, Jaehong Kim, Klinc, Demijan and McLaughlin, Steven,: "Rate-Compatible Punctured Low-Density Parity-CheckCodes with Short Block Lengths" IEEE Transactions on Information Theory, vol. 52, No. 2, 2006, XP002590809 Retrieved from the internet: URL:http://ieeexplore.org/stamp/stamp.jsp?tp=&arnumber=158080&userType=&tag=1 (retrieved on Jul. 7, 2010).

European Search Report dated Jul. 22, 2010.

* cited by examiner

SECURE COMMUNICATION USING ERROR CORRECTION CODES

CROSS REFERENCE TO RELATED APPLICATIONS

This application claims the benefit of U.S. Provisional Application No. 61/171,937, filed Apr. 23, 2009, which is hereby incorporated by reference.

FIELD OF THE DISCLOSURE

The present disclosure relates to data communication, and more specifically, to a method and system for use in secure communication using error correcting codes.

BACKGROUND

Error correcting codes are conventionally used to provide reliability over a noisy communication channel. An error correcting coding scheme transmits extra bits. These extra bits allow the receiver to recover errored bits by deducing the errored bits from the channel observations of the transmitted bits.

Error correcting codes are conventionally designed to provide as much reliability as possible over a noisy channel. However, this high level of reliability leads to codes which are complex and thus require increased computational resources at the receiver.

BRIEF DESCRIPTION OF THE DRAWINGS

Embodiments of the present invention will now be described by way of example only with reference to the accompanying description. Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
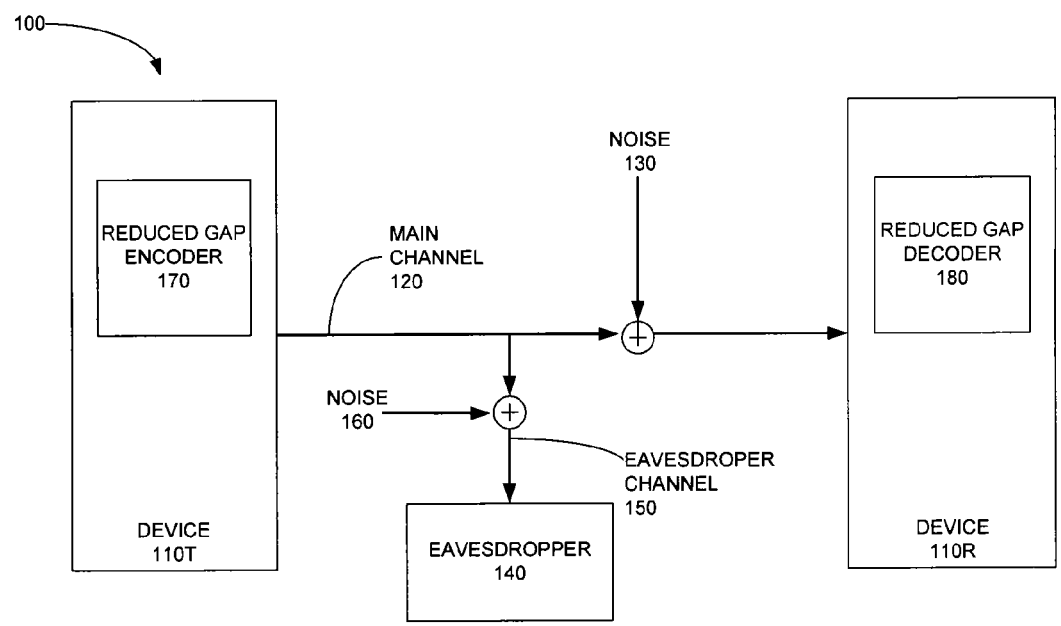
FIG. 1 is a block diagram of a transmitter device and a receiver device utilizing non-systematic error correcting codes, according to some embodiments described herein.

FIG. 1 is a block diagram of a transmitter device and a receiver device utilizing low-density parity-check (LDPC) codes to provide secure communication. System 100 includes two "friendly parties": device 110T, operating as a transmitter; and 110R, operating as a receiver. A person of ordinary skill in the art would understand that some embodiments of device 110 have both transmitter and receiver functionality.

Transmitter 110T and receiver 110R are in communication over a main channel 120, which is subject to a noise input 130.

System 100 also includes another device 140 (an "eavesdropper") which is capable of listening to (eavesdropping on) transmissions on main channel 120, over an eavesdropper channel 150. Eavesdropper channel 150 is subject to a noise input 160. Eavesdropper 140 is passive with respect to main channel 120, i.e., eavesdropper 140 does not jam main channel 120, insert bits on main channel 120, etc. In some embodiments, main channel 120 and eavesdropper channel 150 are wireless. In one of these embodiments, transmitter 110T takes the form of a radio frequency identification (RFID) tag. In still other embodiments, main channel 120 and eavesdropper channel 150 are wired (wire line) channels.

The embodiments described herein utilize specially designed LDPC codes to insure communication between friendly parties that is both reliable and secure. Use of such LDPC codes takes advantage of environments in which the signal quality on main channel 120 (the channel between a "friendly" transmitter and a "friendly" receiver) is better than the signal quality on eavesdropper channel 150. This difference in signal quality may be guaranteed, for example, when the eavesdropper is more than a certain distance away from the friendly transmitter.

Transmitter 110T includes a reduced security gap encoder 170, which applies a reduced security gap LDPC code (described below) during message transmission. Receiver 110R includes a complementary reduced security gap decoder 180, so that reduced security gap encoder 170 cooperates with reduced security gap decoder 180 to provide secure communication over main channel 120. Reduced security gap encoder 170 uses puncturing to hide data from eavesdropper 140, such that all message bits are punctured in reduced security gap encoder 170 rather than being transmitted. Reduced security gap decoder 180 must then deduce the message bits from channel observations of those bits that were transmitted. As long as the signal quality on eavesdropper channel 150 is low, the channel observations are expected to be very noisy. Therefore, reconstruction of the punctured message bits by a decoder within eavesdropper 140 is expected to be hard. The measure of secrecy is the bit-error-rate (BER) over message bits.

Consider the scenario in which "friendly" transmitter 110T wants to transmit an s-bit message $M^s$ to "friendly" receiver 110R. Transmitter 110T uses an error correcting code to encode $M^s$ to an n-bit codeword $X^n$ and transmits $X^n$ over an additive white Gaussian noise (AWGN) channel to receiver 110R. Eavesdropper 140 listens to the transmission over a noisier, independent AWGN channel and tries to reconstruct the message $M^s$. Eavesdropper 140 is assumed to be passive, and thus not allowed to transmit data, so as to jam or interfere in the communication between transmitter 110T and receiver 110R.

Let an average bit-error-rate (BER) over the estimate $\hat{M}_B^s$ of receiver 110R be $P_e^B$ and let an average BER over the estimate $\hat{M}_B^s$ of eavesdropper 140 be $P_e^E$. It is desired that $P_e^B$ be sufficiently low to ensure reliability and that $P_e^E$ be high. When $P_e^E$ is close to 0.5 and the errors are independent and identically distributed, then eavesdropper 140 will not be able to extract much information from the received sequence $Z^n$. This means that, for fixed $P_{e,max}^B$ ($\approx 0$) and $P_{e,min}^E$ ($\approx 0$) the following holds:

a) $P_e^B \leq P_{e,max}^B$ (reliability),
b) $P_e^E \geq P_{e,min}^E$ (security).

Let $SNR_{B,min}$ be the lowest signal-to-noise ratio (SNR) for which condition a) holds, and let $SNR_{E,max}$ and be the highest SNR for which condition b) holds. It is assumed that receiver 110R operates at SNR$_{B,min}$ and that the SNR of eavesdropper 140 is strictly lower than SNR$_{B,min}$.

The quantity SNR$_{B,min}$/SNR$_{E,max}$ is referred to herein as the "security gap". The security gap is alternatively expressed in dB. The size of the security gap in dB describes the minimum required difference between the SNR of receiver 110R and the SNR of eavesdropper 140 to ensure secure communication. Conventional error correcting codes require large (more than approximately 20 dB) security gaps when P$_{e,min}^{E}$>0.4. In contrast, the coding scheme described below exhibits a relatively small security gap.

Figure 2:
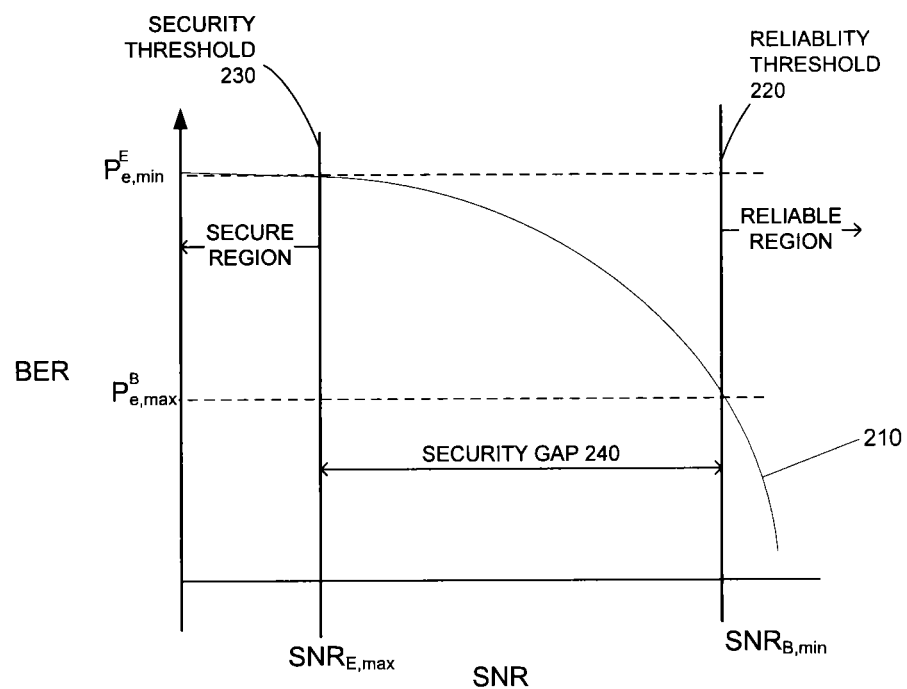
FIG. 2 is a graph illustrating the concept of a security gap.

FIG. 2 is a graph illustrating the concept of the security gap. Curve 210 shows BER versus SNR performance of an example error correction code. SNR$_{B,min}$ is the reliability threshold 220, i.e., the threshold which ensures reliability between transmitter 110T and receiver 110R. SNR$_{E,max}$ is the security threshold 230, i.e., the threshold at which eavesdropper 140 has an appropriately high error rate (e.g., 0.5) to ensure security. The security gap discussed above can be seen in FIG. 2 as area 240, corresponding to the area of code performance which is neither secure enough nor sufficiently reliable. The error correcting coding scheme described herein is specifically designed to generate codes having a performance curve with a small security gap, thus ensuring that a small difference in signal quality results in a transition from the reliable region to the secure region.

The coding scheme disclosed herein uses a particular class of error correcting code known as low-density parity-check (LDPC) codes. The decoder used by both receiver 110R and eavesdropper 140 is assumed to be a belief propagation decoder, which is asymptotically equal to the powerful bitwise maximum a-posteriori (MAP) decoder. Transmitting messages over punctured bits can significantly reduce security gaps and can thus be efficiently used for increased security of data. Security gaps as low as few dB are sufficient to force eavesdropper 140 to operate at BER above 0.49. As will be described in more detail in connection with FIG. 5, this coding scheme, which provides security at the physical layer, can be used in conjunction with existing cryptographic schemes which operate on higher layers of the protocol stack.

An LDPC code can be specified by means of a bipartite graph, composed of variable nodes representing codeword bits and check nodes representing the constraints imposed on the codeword bits. One parameter that describes the bipartite graph of an LDPC code is the degree distribution, which is given in the form of two polynomials $$\lambda(x) = \sum_{i=2}^{d_v} \lambda_i x^{i-1}$$

and $$\rho(x) = \sum_{i=2}^{d_c} \rho_i x^{i-1}.$$

The values d$_v$ and d$_c$ represent the maximum variable and check node degrees, while $\lambda_i$ and $\rho_i$ denote the fractions of edges connected to variable and check nodes of degree i, respectively. From the node perspective, the fraction of variable nodes of degree i is denoted by $\lambda_i$ where $$\lambda_i = (\lambda_i / i) \bigg/ \left( \sum_{i=2}^{d_v} \lambda_i / i \right).$$

Another parameter that describes an LPDC is the reliability threshold (220 in FIG. 2). A code's reliability threshold is defined as the lowest SNR at which the belief propagation decoder can yield arbitrarily low BERs.

A punctured LDPC code is a code where some of the variable nodes are not transmitted. A puncturing pattern distribution $$\pi(x) = \sum_{i=2}^{d_v} \pi_i x^{i-1}$$

describes how an LDPC is punctured, where $\pi_i$ denotes the fraction of variable nodes of degree i that are punctured. This form of puncturing pattern distribution is useful for an asymptotic analysis of punctured LDPC codes. Let p denote the fraction of all punctured bits, so that $$p = \sum_{i=2}^{d_v} \lambda_{i'} \pi_i.$$

The coding scheme disclosed herein transmits messages over punctured bits. The puncturing pattern distribution is selected so that no subset of punctured bits forms a stopping set; otherwise, some punctured (message) bits would not be recoverable in the decoder.

Let the dimension of an LDPC code be d, let the number of message bits be s, and let the number of transmitted codeword bits be n. The code rate is defined as $$R_d = \frac{d}{n}. \qquad \text{(Eq. 1)}$$

while the secrecy rate is defined as $$R_s = \frac{s}{n}. \qquad \text{(Eq. 2)}$$

It is possible, in some scenarios, that the number of punctured (message) bits is smaller than d. In such cases, punctured message bits are coupled with some randomly chosen dummy bits to occupy all independent bit locations in a codeword. Usually in such cases R$_s$<R$_d$. If a code is left unpunctured, and assuming that all independent bit locations carry messages, then R$_s$=R$_d$.

As discussed above, specially designed punctured LDPC codes can exploit the security gap between the friendly and eavesdropper channels, to provide acceptable security without the unnecessary complexity. As noted above, an LDPC code can be described in terms of a puncturing pattern distribution and a degree distribution. A system and method for designing a security gap LPDC will now be described. Reduced security gap encoder 170 then implements one or more of these codes. The method, and the system which implements the method, optimizes the puncturing pattern distribution for LPDCs having a relatively large block length (on the order of 50,000 bits or more). Although such codes are finite in length, asymptotic results are likely to hold for these very long codes, as with codes of infinite length.

The method, and system which implements the method, involves iteratively selecting an optimized puncturing pattern distribution for a code with a given degree distribution. While iterating, the reliability and security thresholds of the current code under consideration are calculated. The method keeps the code with the lowest security gap encountered so far.

Figure 3:
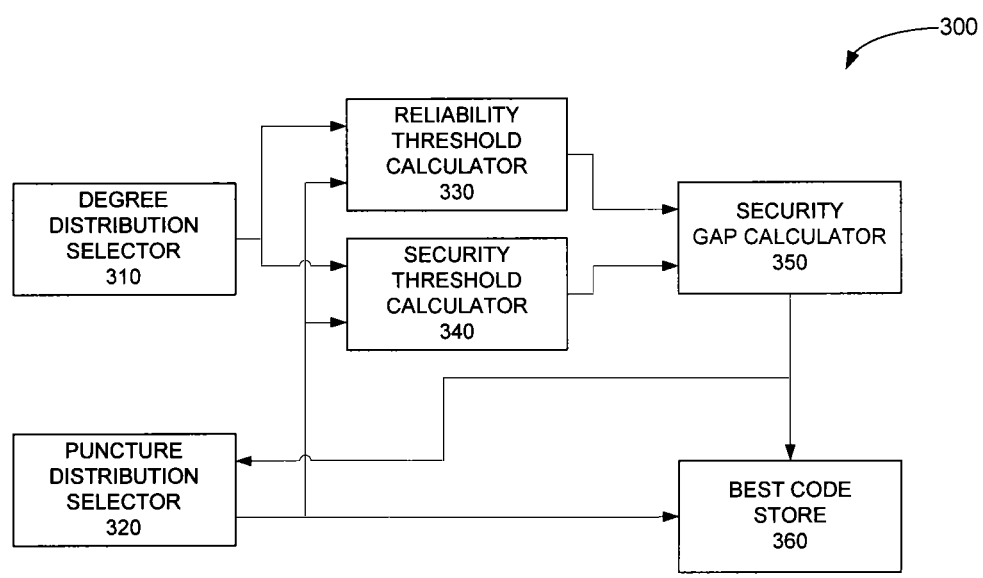
FIG. 3 is a block diagram of system for iteratively selecting an optimized puncturing pattern distribution, according to some embodiments.

FIG. 3 is a block diagram of system for iteratively selecting an optimized puncturing pattern distribution, according to some embodiments. System 300 includes: a degree distribution selector 310; a puncturing pattern distribution selector 320; a reliability threshold calculator 330; a security threshold calculator 340; a security gap calculator 350; and a best code store 360. System 300 begins operation by selecting two parameters describing the code to be generated. Degree distribution selector 310 selects the code's degree distribution, while puncturing pattern distribution selector 320 selects an initial puncturing pattern distribution. The degree distribution will remain constant while the puncturing pattern distribution is varied during the selection process. The selection by degree distribution selector 310 is not specific to the design of the security gap LPDC, so any criteria relevant to error correcting codes can be used. As will be discussed shortly, puncturing pattern distribution selector 320 is guided by previous iterations.

The degree distribution and the initial puncturing pattern distribution are supplied to reliability threshold calculator 330, and to security threshold calculator 340. Each calculator block uses these inputs to perform its respective calculation of the current code's threshold. In some embodiments, reliability threshold calculator 330 and security threshold calculator 340 each use density evolution to determine the asymptotic bit-error rate of the current code under consideration. As should be appreciated by a person of ordinary skill in the art, density evolution tracks the evolution of the probability density function (PDF) of messages as they are passed between variable and check nodes during the decoding process. A simplified form of density evolution assumes that messages have Gaussian probability distribution functions, so that density evolution can be reduced to tracking only one parameter: the mean $m_u^{(k)}$.

The reliability threshold and the security threshold calculated by reliability threshold calculator 330 and security threshold calculator 340, respectively, are provided to security gap calculator 350, which calculates security gap 240, i.e., the difference between these thresholds. The calculated security gap 240 for the current code under consideration is provided to best code store 360. Best code store 360 remembers the code with the lowest security gap 240 as the iterations progress. In some embodiments, best code store 360 remembers the code by storing the current puncturing pattern distribution. This is sufficient because the other parameter defining the code (the degree distribution) is fixed at the start.

In some embodiments, best code store 360 performs an explicit comparison of the current puncturing pattern distribution and the remembered puncturing pattern distribution, and replaces the remembered distribution with the current distribution if the current distribution has a lesser security gap value. In some embodiments, best code store 360 obtains the current puncturing pattern distribution from puncturing pattern distribution selector 320.

Having generated a first code based on the initial puncturing pattern distribution pattern, system 300 starts another iteration to generate another code having a different puncturing pattern distribution. In this next iteration, puncturing pattern distribution selector 320 uses security gap 240 calculated by security threshold calculator 340 (representing the performance of the last code) and the history of previously chosen puncturing pattern distributions to guide selection of the next puncturing pattern distribution. In some embodiments, puncturing pattern distribution selector 320 uses differential evolution to choose the next puncturing pattern distribution.

This next iteration proceeds as described above, using the same initial degree distribution but a newly selected puncturing pattern distribution. If the next iteration produces a code with a lower security gap 240 than the first code, best code store 360 replaces the first code with the new code. Otherwise, the first code remains in best code store 360 unless and until a better code is found.

Having described a system and method for selecting an asymptotic LPDC code with a reduced gap, a theoretical framework will now be described. The asymptotic analysis used below demonstrates that that transmitting messages are transmitted over punctured bits significantly reduces the security gap. Message in the belief propagation decoder are assumed to be Gaussian, so that the mean value of check-to-variable node messages in the k-th iteration is $$m_u^{(k)} = \sum_{s=2}^{d_c} \rho_s \phi^{-1}\left(1 - \frac{1}{(1-e^{(k)})^{s-1}}\left[1 - \sum_{j=2}^{d_v}\left\{\lambda_j \pi_j \sum_{i=0(j-1)}^{j-1} \chi_i^{(k)} \phi(im_u^{(k-1)}) + \lambda_j(1-\pi_j)\sum_{i=0(j-1)}^{j-1}\chi_i^{(k)}\phi(im_u^{(k-1)}+m_{u_0})\right\}\right]^{s-1}\right), \quad \text{(Eq. 3)}$$

where $$_n\chi_m^k = \binom{n}{m}(\varepsilon^{(k-1)})^{n-m}(1-\varepsilon^{(k-1)})^m, \varepsilon^{(k)} = 1 - \rho(1-e^{(k)}),$$

$$e^{(k)} = \sum_{j=2}^{d_v}\lambda_j\pi_j(1-\rho(1-e^{(k-1)})), e^{(0)} = \sum_{i=2}^{d_v}\lambda_i\pi_i, m_{u_0} = 2/\sigma^2$$

and $\sigma^2$ is the noise variance.

Using $m_u^{(k)}$, the BER over all variable nodes in the k-th iteration is $$P_e^{(k)} = P_{e_1}^{(k)} + P_{e_2}^{(k)} \quad \text{(Eq. 4)}$$

$$= \sum_{j=2}^{d_v}\lambda_{i'}\pi_j\sum_{i=0_j}^{j}\chi_i^{(k)}Q\left(\sqrt{\frac{im_u^{(k)}}{2}}\right) + \sum_{j=2}^{d_v}\lambda_{i'}(1-\pi_j)\sum_{i=0_j}^{j}\chi_i^{(k)}Q\left(\sqrt{\frac{im_u^{(k)}+m_{u_0}}{2}}\right).$$

The first term, $P_{e_1}^{(k)}$, is the contribution from the punctured variable nodes, while the second, $P_{e_2}^{(k)}$, is the contribution from the unpunctured variable nodes. Thus, if the fraction of punctured nodes is p, the average BER over punctured nodes is $$P_{e,p}^{(k)} = \frac{1}{p} P_{e_1}^{(k)}$$ (Eq. 5)

and can be computed at arbitrary SNRs, both above and below the threshold.

As noted above, security gaps 240 can be attained by using puncturing distributions that are specifically designed to improve security. With the theoretical framework described above, optimization of puncturing distributions can be described as follows. Let $SNR_E$ be the maximum SNR for which $P_{e,p}^{(k)} \geq P_e^E$ for any k. Let $SNR_B$ be the threshold of the punctured code. Then, for a given degree distribution ($\lambda(x)$, $\rho(x)$) and puncturing fraction p, the problem at hand is:

$$\underset{\pi_i's}{\operatorname{argmin}} \frac{SNR_B}{SNR_E}$$

subject to $$0 \leq \pi_i \leq 1 \text{ for all } 2 \leq i \leq d_v,$$

$$\sum_{i=2}^{d_v} \lambda_i' \pi_i = p,$$

$$SNR_B < \infty,$$

$$SNR_E > -\infty.$$

The sections above describe the design of reduced security gap LPDC codes with relatively block lengths. The performance of such codes was also analyzed. A system and method of designing reduced security gap LPDC codes having much smaller block lengths will now be described. In particular, a puncturing algorithm for security at finite block lengths will be disclosed. Reduced security gap encoder 170 then implements one or more of codes designed by the algorithm. As noted above, in an environment involving two friendly parties 110T, 110R and an eavesdropper 140, a code with good error-correcting performance is desired for receiver 110R. Yet at the same time, the code's error-correcting performance for eavesdropper 140 is desired to be very bad when eavesdropper 140 operates with a lower SNR. The puncturing algorithm described below makes this tradeoff in an efficient manner.

Before describing the puncturing algorithm, a brief review of LPDC decoding will be presented. However, a person of ordinary skill in the art is expected to be familiar with this terminology. An LDPC code can be described by a sparse bipartite graph which includes variable nodes and check nodes. This graph is used by iterative message passing algorithm (e.g., belief propagation) uses the graph to decode an LPDC. At each round, the received message is passed from variable nodes to check nodes, and from check nodes back to variable nodes. A variable node corresponding to a punctured bit (a "punctured variable node") is recovered when it receives a non-zero message from at least one of its neighboring check nodes for the first time. A check node that provides the first non-zero message is called the survived check node. A punctured variable node is referred to as k-step recoverable (k-SR) if it is recovered in the k-th iteration.

The puncturing algorithm described below starts with an initial unpunctured code (mother code) and selects a particular puncturing pattern distribution for the initial code, by selecting particular nodes to be punctured variable nodes. The algorithm selects a desirable puncturing pattern distribution by first minimizing the number of k-SR nodes, where 1<=k<=K. This first minimization results in a code which "confuses" the eavesdropper with a low SNR. Then, for k>K the number of k-SR nodes is maximized, which results in a code which "helps" the friendly listener with a high SNR. The number K is chosen to be large enough that the error recovery probability at the eavesdropper's SNR is close to saturation. Typically, K is 2 or 3.

Figure 4:
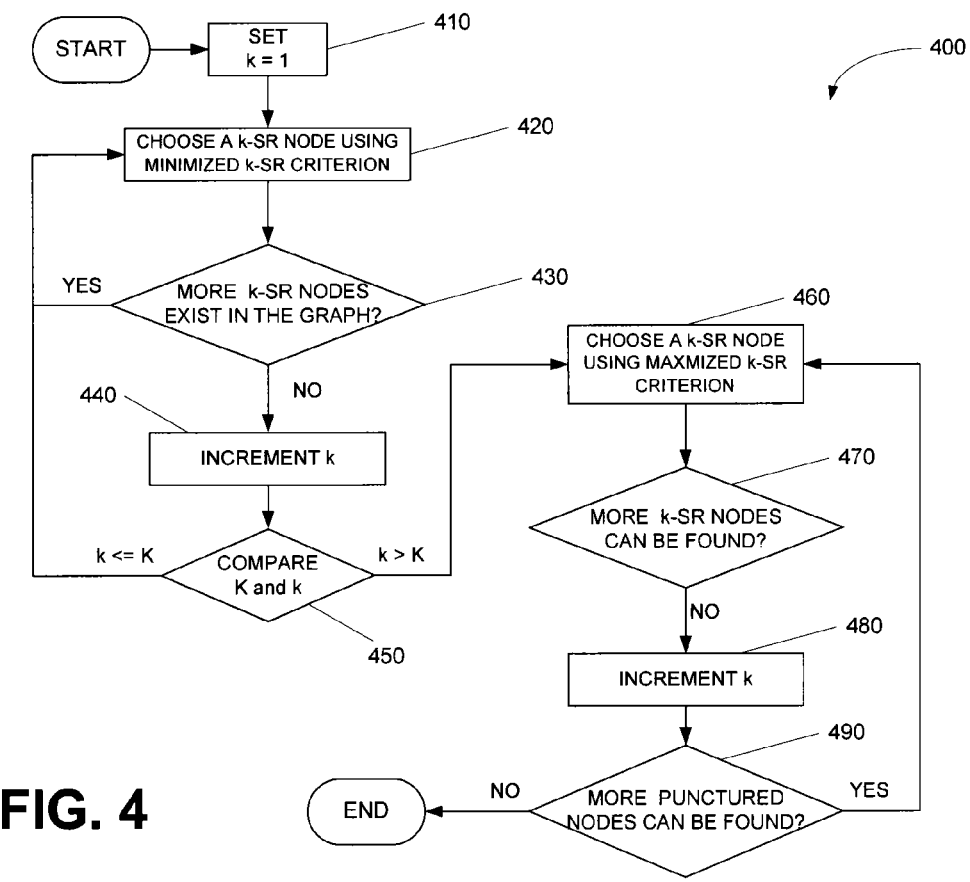
FIG. 4 is a flow chart of the puncturing algorithm to produce codes that provide security at finite block lengths, according to some embodiments.

FIG. 4 is a flow chart describing in more detail the puncturing algorithm to produce codes that provide security at finite block lengths, according to some embodiments. The process 400 begins at block 410, where a variable k is initialized to 1. At block 420, a k-SR node is chosen, using a minimized k-SR criterion, to be a punctured variable node. In this regard, the nodes in the code's graph are examined to find k-SR nodes and selected nodes are marked in some way as "punctured" nodes (e.g., type field, boolean field, or other mechanisms as appreciated by persons of ordinary skill in the art).

Block 420 selects a k-SR node using a criterion which minimizes the overall number of selected k-SR nodes when the algorithm finishes. One minimization criterion is as follows. A k-SR variable node can be found if there exists a check node whose neighbors are either unpunctured or l-SR, where l<k. Such a check node is referred to herein as a recovery check node. A selection criterion which minimizes the number of k-SR nodes is to choose (each time block 420 is performed) from all unpunctured variable nodes, a variable node with the most recovery check nodes to be a punctured variable node.

Block 430 determines whether any more k-SR nodes exist in the code graph. If Yes, processing continues at block 420 with other k-SR nodes. When all k-SR nodes have been examined for the current value of k, processing moves to block 440, where k is incremented. Next, block 450 compares k to K. If k<=K, the process repeats starting at block 420, where a k-SR nodes is selected again using a minimized k-SR criteria, but with a new value of k. If block 450 determines instead that k>K, the loop ends. At this point, the number of k-SR nodes has been minimized for 1<=k<=K.

With k being K+1 after exiting the loop, processing continues at block 460 where k-SR nodes are maximized. Persons of ordinary skill in the art will appreciate various methods of maximizing the overall number of selected k-SR nodes, such as the grouping algorithm. Block 470 determines whether any more k-SR nodes exist in the code graph. If Yes, processing continues at block 460 with over k-SR nodes. When all k-SR nodes have been examined for the current value of k, processing moves to block 480, where k is incremented. Block 490 determines whether any more punctured nodes can be found. If yes, processing repeats starting at block 460, where k-SR nodes are maximized again, but with a new value of k. If no more punctured nodes can be found, the process 400 ends. At this point, the number of k-SR nodes has been maximized for k>K and minimized for 1<=k<=K.

The arrangement of punctured variable nodes in the tripartite graph describes the puncturing pattern distribution of the LPDC. Punctured variable nodes can be described in terms of how many steps it takes the decoder to recover the encoded information, where a k-step recoverable (k-SR) node is recovered in the k-th iteration. Selecting punctured variable nodes in the graph to minimize the total number of some k-SR nodes (those for 1<=k<=K) and to maximize the total number of other k-SR nodes (those for k>K) produces a code which confuses the eavesdropper while helping the friendly receiver.

In some embodiments, the algorithm is run more than once to select more than one puncturing pattern distribution for the same initial (mother) code. Using more than one puncturing pattern distribution allows the secrecy rate and the security gap to be adapted at run time. Generally, the secrecy gap decreases with as the security rate decreases. This can be advantageous in dynamic environments where the relationship between the friendly receiver and the eavesdropper can vary over time. That is, sometimes an eavesdropper manages to come 'close' to the signal and consequently receives it with a better SNR, while other times it doesn't.

In some embodiments, all punctured nodes carry messages and the pattern itself is changed. In other embodiments, the pattern is the same for all secrecy rates while messages are transmitted only over a subset of messages. Priority is given to those punctured nodes with high levels of recoverability.

Having described a system and method which implements a puncturing algorithm to produce codes that provide security at finite block lengths, a theoretical framework for understanding the performance of such codes will now be described. The recovery error $P_e^r$ is used to explore the trade-off between the conflicting goals of a code with good error-correcting performance for receiver 110R but bad error-correcting performance for eavesdropper 140. The formula for $P_e^r$ over an additive white noise Gaussian (AWGN) channel is $$P_e^r(v) = Q\left(\sqrt{\frac{1}{2}\phi^{-1}(1-(1-\phi(2/\sigma^2))^{S(v)})}\right), \quad \text{(Eq. 6)}$$

where $$\phi(x) \equiv 1 - 1/\sqrt{4\pi x}\int_R \tanh\frac{u}{2}e^{-(u-x)^2/4x}\,du$$

for x>0 and $\phi(x)\equiv 1$ for x=0, $\rho^2$ is the noise variance, Q( ) is the Q-function, and S(v) is the number of unpunctured nodes in the recovery tree of v.

These equations can be used to explore the behavior of recovery error probability $P_e^r(v)$ in terms of the number of unpunctured variable nodes S(v) at different SNRs. When the SNR is high (as on the friendly receiver's channel 120), the growth of recovery error probability is almost linear, and is relatively slow with respect to the size of the recovery tree. On the other hand, at low SNRs (as on the eavesdropper's channel 150) the growth of recovery error probability becomes exponential and saturates increasingly fast. In the region where recovery error probability for the eavesdropper is not saturated, increasing the number of nodes in the recovery tree is then expected to have a higher impact on the performance of eavesdropper 140 than on the performance of receiver 110R. In contrast, when recovery error probability at eavesdropper 140 is close to saturation, increasing the number of nodes does seem reasonable, since the performance of eavesdropper 140 is already at levels where it can not deteriorate much further while the performance of friendly receiver 110R suffers.

Figure 5:
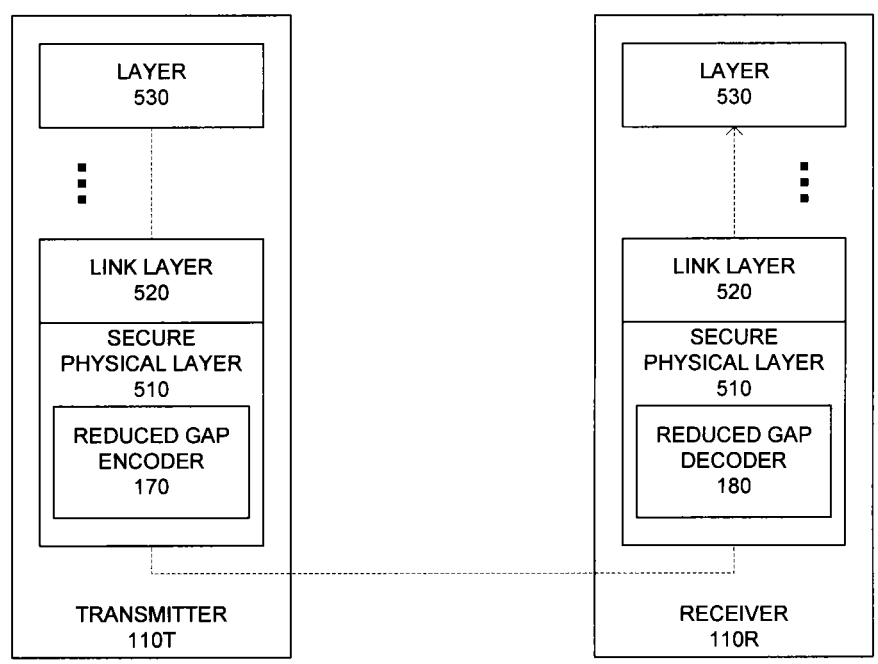
FIG. 5 is a logical block diagram of a system with a secure physical layer, according to some embodiments described herein.

FIG. 5 is a logical block diagram of a system 500 with a secure physical layer, according to some embodiments. System 500 includes transmitter 110T and receiver 110R, each of which includes secure physical layer 510, link layer 520, and additional layer 530. System 500 takes advantage of the presence of reduced security gap encoder 170, which provides security, within physical layer 510. In this embodiment, security provided at the physical layer replaces cryptographic algorithms at a higher layer (e.g., wired equivalent privacy (WEP) at the media access control (MAC) layer, internet protocol security (IPSec) at the network layer, secure sockets layer (SSL) at the application layer, etc.)

The coding techniques disclosed herein do provide security at the physical layer, but these techniques can also be used in combination with any protocol layer above the physical layer. Thus, some embodiments of transmitter 110T and receiver 110R (not shown) combine encryption at higher layers of the protocol stack with the security provided by reduced security gap encoder 170 at the physical layer.

Figure 6:
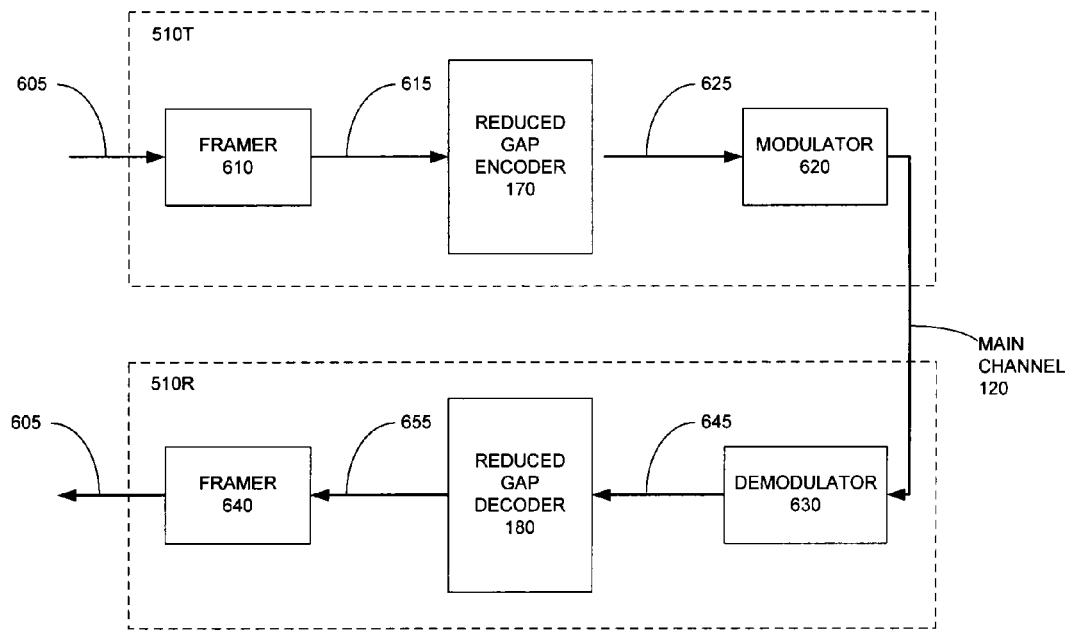
FIG. 6 is a block diagram illustrating selected components of a secure physical layer from FIG. 4, according to some embodiments described herein.

FIG. 6 is a block diagram illustrating selected components of one embodiment of secure physical layer 510. A transmit secure physical layer 510T includes a framer 610, reduced security gap encoder 170, and a modulator 620. Framer 610 operates on a message 605 from a higher protocol layer. Message 605 is a stream of bits. Framer 610 divides the bit stream into blocks, and outputs a block 615, which may include header and trailer information. Block 615 is encoded by reduced security gap encoder 170. Reduced security gap encoder 170 produces one or more encoded bits 625. Encoded bits 625 are modulated by modulator 620 to produce symbols, which are transmitted over main channel 120 to a receiver with secure physical layer 510R.

Receive secure physical layer 510R includes a demodulator 630, reduced security gap decoder 180, and a framer 640. Symbols received on main channel 120 are mapped to bits 645 by demodulator 630, and bits 645 are decoded by reduced security gap decoder 180. The group of decoded bits 655 is received by framer 640, which strips off header/trailer bits as necessary to reveal originally transmitted message 605. Message 605 may then be passed up to a higher protocol layer. Notably, message 605 is reconstructed without the transmission of any bits of the original message in the clear.

In some embodiments, one side of the communication channel has less processing or computing capabilities than the other. In some embodiments, the properties of the communication channel may be asymmetrical (e.g., 10 Mbit/sec in one direction and 1 Mbit/sec in the other). In such embodiments, one side may use different modulation and/or framing techniques when transmitting than the other side does. As a non-limiting example, one side may transmit using quadrature amplitude modulation with 16 different symbols (QAM16) while the other side may transmit using quadrature amplitude modulation with 64 different symbols (QAM64).

Figure 7:
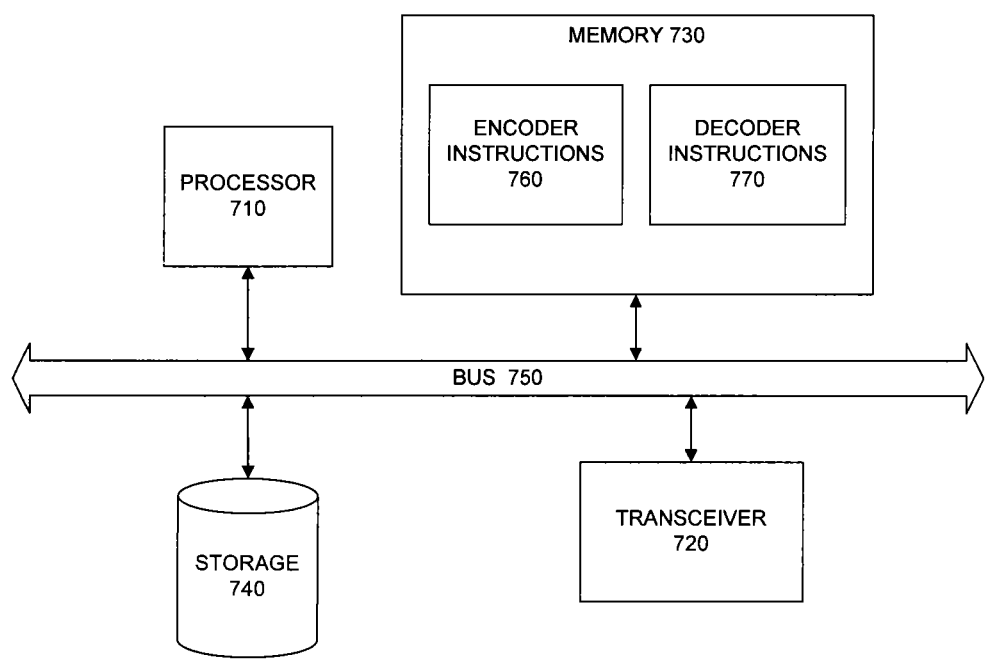
FIG. 7 is a hardware block diagram of a device from FIG. 1, according to some embodiments described herein.

FIG. 7 is a hardware block diagram of an embodiment of device 110. Device 110 contains a number of well known components, including a processor 710, a transceiver 720, memory 730, and non-volatile storage 740. These components are coupled via bus 750. Omitted from FIG. 7 are a number of conventional components, known to those skilled in the art, that are not necessary to explain the operation of device 110. Examples of non-volatile storage include, for example, a hard disk, flash RAM, flash ROM, EPROM, etc.

Transceiver 720 may support one or more of a variety of different networks using various technologies, media, speeds, etc. A non-limiting list of examples of wireless technologies includes: radio frequency identification (RFID) networks (e.g., ISO 14443, ISO 18000-6); wireless local area networks (e.g. IEEE 802.11, commonly known as WiFi); wireless wide area networks (e.g., IEEE 802.16, commonly known as WiMAX); wireless personal area networks (e.g., Bluetooth™, IEEE 802.15.4) and wireless telephone networks (e.g., CDMA, GSM, GPRS, EDGE).

In the embodiment of FIG. 7, reduced security gap encoder 170 and reduced security gap decoder 180 are implemented in software, i.e., instructions that are retrieved from a memory and then executed by processor 710. Processor 710 may take the form of, for example, a microprocessor, network processor, microcontroller, reconfigurable processor, extensible processor, graphics processor, etc.). Memory 730 contains encoder instructions 760 and/or decoder instructions 770, which programs or enables processor 710 to implement the functions of reduced security gap encoder 170 and/or reduced security gap decoder 180.

Some embodiments of reduced security gap encoder 170 and reduced security gap decoder 180 are stored on a computer-readable medium, which in the context of this disclosure refers to any structure which can contain, store, or embody instructions executable by a processor. The computer readable medium can be, for example but not limited to, based on electronic, magnetic, optical, electromagnetic, infrared, or semiconductor technology. Specific examples of a computer-readable medium using electronic technology would include (but are not limited to) the following: a random access memory (RAM); a read-only memory (ROM); and an erasable programmable read-only memory (EPROM or Flash memory). A specific example using magnetic technology includes (but is not limited to) a disk drive; and a portable computer diskette. Specific examples using optical technology include (but are not limited to) a compact disk read-only memory (CD-ROM) or a digital video disk read-only memory (DVD-ROM).

In some embodiments (not shown), reduced security gap encoder 170 and reduced security gap decoder 180 are implemented in digital hardware logic, as encoding logic and decoding logic. Technologies used to implement encoding logic and decoding logic include, but are not limited to, a programmable logic device (PLD), a programmable gate array (PGA), field programmable gate array (FPGA), an application-specific integrated circuit (ASIC), a system on chip (SoC), and a system in package (SiP). Such digital logic implementations are not limited to pure digital but may also include analog sections or components.

Furthermore, embodiments of device 110 which implement reduced security gap encoder 170 and reduced security gap decoder 180 with digital logic may also contain software to implement functions such as management, initialization of hardware, protocol stack layers, etc. In yet another embodiment of device 110 (not illustrated), reduced security gap encoder 170 and/or reduced security gap decoder 180 are implemented by a combination of software (i.e., instructions executed on a processor) and hardware logic.

FIG. 7 depicts a communication device 110 that uses a puncture code to provide security, where the puncture code is designed and/or selected in accordance with the techniques described above in connection with FIGS. 1-5. The design techniques described in connection with FIGS. 1-5 are implemented on a computer which contains conventional components (such as those shown in FIG. 7), except that some embodiments of the computer used to design the code are not required to include a transceiver, since the computer that generates the code used in a communications device is not required to transmit or receive using the code.

In this regard, the methods of selecting puncturing pattern distributions described herein can be implemented in software, i.e., as instructions that are retrieved from a memory and then executed by a processor. The memory then contains instructions which program or enable the processor to implement the methods of selecting puncturing pattern distributions as described herein. Alternatively, these methods of selecting puncturing pattern distributions can be implemented in digital hardware logic. As yet another alternative, these methods of selecting puncturing pattern distributions can be implemented in a combination of software and digital hardware logic.

Any process descriptions or blocks in flowcharts would be understood as representing modules, segments, or portions of code which include one or more executable instructions for implementing specific functions or steps in the process. As would be understood by those of ordinary skill in the art of the software development, alternate implementations are also included within the scope of the present invention as defined by the claims. In these alternate implementations, functions may be executed out of order from that shown or discussed, including substantially concurrently or in reverse order, depending on the functionality involved.

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

The invention claimed is:

1. A method, implemented in a computer, of selecting a puncturing pattern for a low density parity check (LDPC) code, the method comprising:
    selecting, by a processor in the computer, a puncturing pattern distribution for the LDPC code;
    calculating a security threshold and a reliability threshold for the LDPC, the LDPC having the selected puncturing pattern distribution and also described by a degree distribution;
    storing the selected puncturing pattern distribution responsive to a security gap for the LDPC being a lowest value encountered in any prior iterations;
    selecting another puncturing pattern distribution for the LDPC code; and
    repeating the calculating, the storing, and the selecting another puncturing pattern distribution steps.

2. The method of claim 1, wherein the repeating ceases when the stored puncturing pattern distribution drops below a predetermined threshold.

3. The method of claim 1, wherein the selecting the another puncturing pattern distribution for the LDPC code comprises selecting the another puncturing pattern distribution based at least on performance of previously selected puncturing pattern distributions.

4. The method of claim 1, further comprising calculating the security gap as a difference between the security threshold and the reliability threshold.

5. The method of claim 1, further comprising selecting the degree distribution.

6. The method of claim 1, wherein the selecting another puncturing pattern distribution further comprises using differential evolution to guide the selection of the another puncturing pattern distribution.

7. The method of claim 1, wherein the selecting another puncturing pattern distribution further comprises optimizing the selecting using a linear programming algorithm.

8. A computer apparatus configured to select a puncturing pattern for a low density parity check (LDPC) code, the computer apparatus comprising:
memory; and
a processor configured by instructions stored in the memory to:
(a) select a puncture pattern distribution for the LDPC code;
(b) calculate a security threshold and a reliability threshold for the LDPC, the LDPC having the selected puncture pattern distribution and also described by a degree distribution;
(c) calculate a security gap between the security threshold and the reliability threshold;
repeat (b) and (c) after selecting another puncture pattern distribution for the LDPC code; and
output the selected puncture pattern distribution having a lowest security gap.

9. The computer apparatus of claim 8, wherein the processor is further configured by the instructions to select the another puncture pattern distribution based at least on performance of previously selected puncture pattern distributions.

10. The computer apparatus of claim 8, wherein the processor is further configured by the instructions to calculate the security gap as a difference between the security threshold and the reliability threshold.

11. A method, implemented in a computer, of selecting a puncturing distribution pattern for a low density parity check (LDPC) code, the LPDC described by a graph containing a plurality of nodes, at least some of the nodes being k-SR nodes, the method comprising:
initializing, by a processor in the computer, an iteration variable k to 1;
choosing one of the k-SR nodes using a minimized k-SR criterion;
when all of the k-SR nodes have been examined for minimization of a current value of k, incrementing k and comparing the incremented k to a maximum value K;
when the incremented k exceeds K, choosing one of the k-SR nodes using a maximized k-SR criterion;
when all of the k-SR nodes have been examined for minimization of a current value of k, incrementing k and determining whether all puncture nodes have been examined; and
when all the puncture nodes have not been examined, repeating the choosing using the maximized k-SR criterion.

12. The method of claim 11, wherein the choosing one of the k-SR nodes using the minimized k-SR criterion comprises:
marking the chosen k-SR node as a punctured variable node.

13. The method of claim 12, wherein the puncturing pattern distribution is described by an arrangement of punctured variable nodes.

14. The method of claim 11, further comprising:
responsive to all of the k-SR nodes having been examined for minimization of a current value of and to the incremented k not meeting or exceeding K, repeating the choosing using the minimized k-SR criterion.

15. The method of claim 11, wherein the choosing using the minimized k-SR criterion comprises:
choosing, from all unpunctured variable nodes in the graph, a variable node with more recovery check nodes than any other node.

16. The method of claim 11, wherein the choosing using the maximized k-SR criterion uses a grouping algorithm.

17. A computer apparatus configured to select a puncturing distribution pattern for a low density parity check (LDPC) code, the LPDC described by a graph containing a plurality of nodes, at least some of the nodes being k-step recoverable (k-SR) nodes, the computer apparatus comprising:
memory; and
a processor configured by instructions stored in the memory to:
minimize the number of k-SR nodes for a value k, where $1<=k<=K$; and
after the minimization, maximize the number of k-SR nodes for the value k, where $k>K$.

18. The computer apparatus of claim 17, wherein the processor is further configured to minimize by selecting some of the k-SR nodes to be punctured variable nodes while minimizing the number of k-SR nodes for $1<=k<=K$.

19. The computer apparatus of claim 17, wherein the processor is further configured to maximize by selecting other of the k-SR nodes to be punctured variable nodes while maximizing the number of k-SR nodes for $k>K$.

20. The computer apparatus of claim 17, wherein the processor is further configured to minimize by selecting some of the k-SR nodes to be punctured variable nodes while minimizing the number of k-SR nodes for $1<=k<=K$, and the processor is further configured to maximize by selecting other of the k-SR nodes to be punctured variable nodes while maximizing the number of k-SR nodes for $k>K$, wherein the puncturing pattern distribution is described by the arrangement of the punctured variable nodes.

* * * * *